(12) United States Patent
Noji

(10) Patent No.: US 7,735,768 B2
(45) Date of Patent: Jun. 15, 2010

(54) WINDING DEVICE AND WINDING METHOD FOR MULTI POLAR ARMATURE

(75) Inventor: Kaoru Noji, Fukushima (JP)

(73) Assignee: Nittoku Engineering Co., Ltd., Saitama (JP)

( * ) Notice: Subject to any disclaimer, the term of this patent is extended or adjusted under 35 U.S.C. 154(b) by 180 days.

(21) Appl. No.: 12/068,166

(22) Filed: Feb. 4, 2008

(65) Prior Publication Data
US 2008/0203213 A1 Aug. 28, 2008

(30) Foreign Application Priority Data
Feb. 26, 2007 (JP) .............................. 2007-045629

(51) Int. Cl.
*H02K 15/085* (2006.01)
(52) U.S. Cl. ....................... 242/432; 242/432.2; 29/596
(58) Field of Classification Search ................. 242/432, 242/432.1–432.4, 432.6, 444, 445.1; 29/596, 29/605
See application file for complete search history.

(56) References Cited

U.S. PATENT DOCUMENTS

| 6,098,912 A * | 8/2000 | Noji ......................... 242/432.5 |
| 6,254,027 B1 * | 7/2001 | Kunou ..................... 242/432.4 |
| 6,622,955 B2 * | 9/2003 | Stratico et al. ........... 242/432.4 |
| 7,243,873 B2 * | 7/2007 | Noji ........................... 242/432 |
| 7,543,774 B2 * | 6/2009 | Stroebel et al. .......... 242/433.4 |
| 2002/0088892 A1 * | 7/2002 | Komuro et al. .......... 242/432.3 |
| 2004/0173710 A1 * | 9/2004 | Stratico et al. .............. 242/432 |
| 2005/0029385 A1 * | 2/2005 | Stratico et al. ........... 242/432.2 |
| 2006/0169822 A1 * | 8/2006 | Noji ......................... 242/432.2 |
| 2006/0273214 A1 * | 12/2006 | Stratico et al. .............. 242/432 |
| 2007/0181732 A1 * | 8/2007 | Noji ......................... 242/432.2 |
| 2009/0057473 A1 * | 3/2009 | Ujiie ....................... 242/433.3 |

FOREIGN PATENT DOCUMENTS

| JP | 2003-204659 | 7/2003 |
| JP | 2006-081372 | 3/2006 |

* cited by examiner

*Primary Examiner*—Evan H Langdon
(74) *Attorney, Agent, or Firm*—Rabin & Berdo, P.C.

(57) ABSTRACT

A winding device (1) for a multi polar armature, which simultaneously winds a plurality of wire rods (5) onto a core (7) on which a plurality of winding cores (9) are arranged circularly, includes an index mechanism (11) for rotating the core (7) about a central axis thereof, a nozzle (3) for reeling out the plurality of wire rods (5), and a nozzle moving mechanism (12) for moving the nozzle (3). Every time the nozzle (3) completes a single revolution around the winding core (9), a twist (6) occurring in the wire rods (5) is undone by having the index mechanism (11) cause the core (7) to perform a single revolution about a central axis (T) thereof and having the nozzle moving mechanism (12) cause the nozzle (3) to follow the winding core (9) as the core (7) performs the single revolution.

6 Claims, 4 Drawing Sheets

WINDING DEVICE AND WINDING METHOD FOR MULTI POLAR ARMATURE

TECHNICAL FIELD OF THE INVENTION

This invention relates to a winding device and a winding method for winding a wire rod around a multi polar armature such as a stator or a rotor.

DESCRIPTION OF RELATED ART

It is generally known that by winding a plurality of wire rods simultaneously instead of a single wire rod, the space factor (density) of the winding is increased.

As a device for winding a plurality of wire rods simultaneously, JP 2003-204659A discloses a device comprising a nozzle having a plurality of guide holes penetrated by wire rods, in which the nozzle is moved around respective teeth (winding cores) of a core to form the plurality of wire rods unreeled from the nozzle into a bundle which is wound around each tooth of a stator.

In this type of device, if winding is performed without rotating the nozzle itself as the nozzle revolves around the tooth, a twist corresponding to a single revolution is formed in the wire rods every time the nozzle completes a single revolution around the tooth. When the twist is formed in the wire rods within a slot disposed between teeth, the space factor of the wire rods decreases dramatically, leading to deterioration in the performance of the motor.

Hence, the present applicant has proposed and filed an application for a device that undoes a twist formed in wire rods every time a nozzle completes a single revolution around a tooth (JP2006-81372A).

The winding device disclosed in JP2006-81372A undoes a twist formed in wire rods by turning the core about a site around which the wire rods are wound every time the nozzle completes a single revolution around the tooth.

SUMMARY OF THE INVENTION

However, in the winding device disclosed in JP2006-81372A, a core turning mechanism for turning the core about the site around which the wire rods are wound is required in addition to an index mechanism for rotating the core about its central axis, and as a result, the device becomes extremely complicated to manufacture.

This invention has been designed in consideration of this problem, and it is an object thereof to provide a winding device and a winding method for a multi polar armature in which a twist in wire rods can be eliminated by means of a simple structure.

In order to achieve above object, this invention provides a winding device for a multi polar armature, which simultaneously winds a plurality of wire rods onto a core on which a plurality of winding cores are arranged circularly. The winding device for a multi polar armature comprises an index mechanism for rotating the core about a central axis thereof, a nozzle for reeling out the plurality of wire rods, and a nozzle moving mechanism for moving the nozzle, wherein, every time the nozzle completes a single revolution around a winding core, a twist occurring in the wire rods is undone by having the index mechanism cause the core to perform a single revolution about the central axis thereof and having the nozzle moving mechanism cause the nozzle to follow the winding core as the core performs the single revolution.

PREFERRED EMBODIMENT OF THE INVENTION

An embodiment of this invention will be described below with reference to the drawings.

Figure 1:
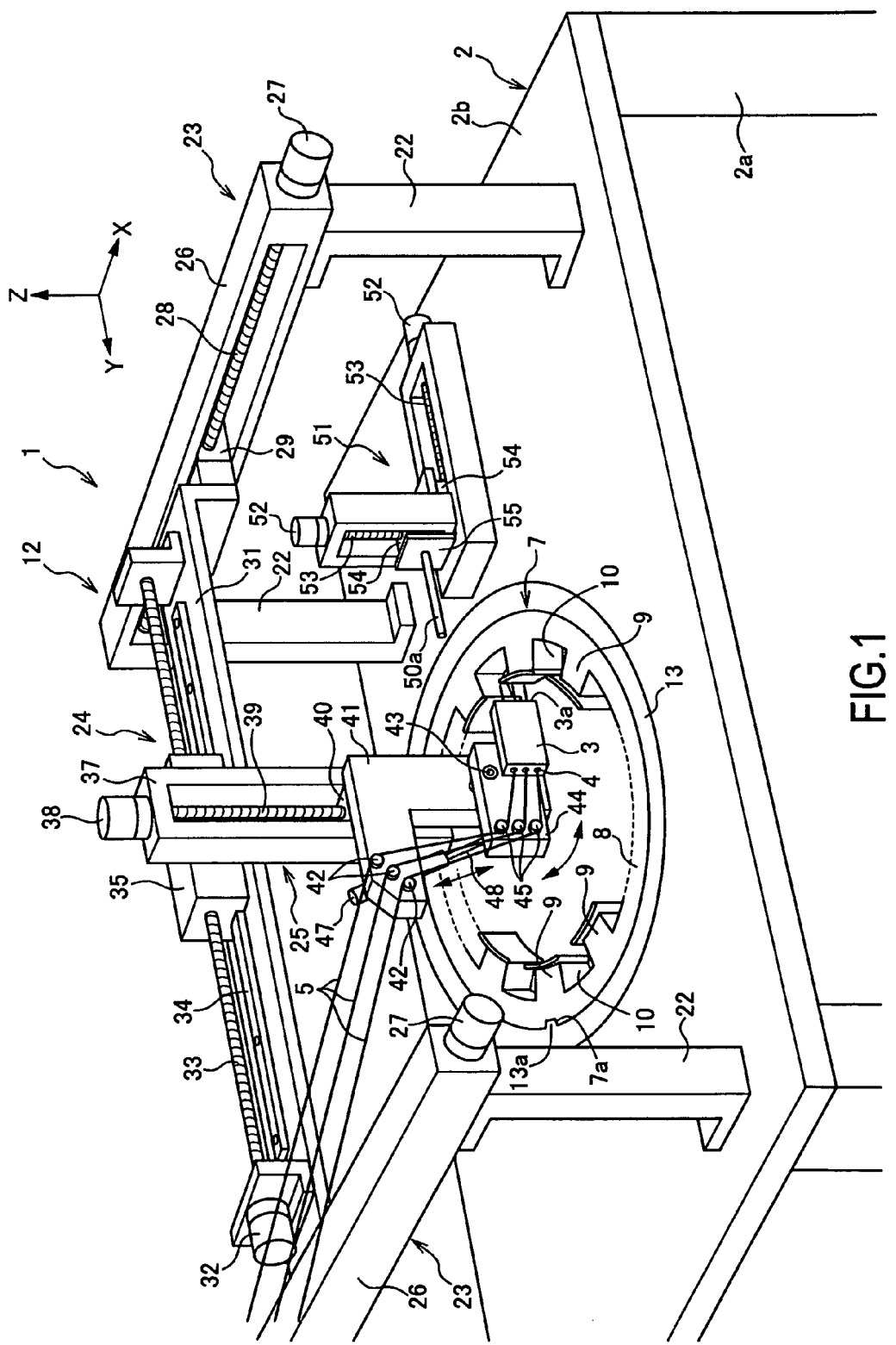
FIG. 1 is a perspective view showing a winding device according to an embodiment of this invention.
Figure 2:
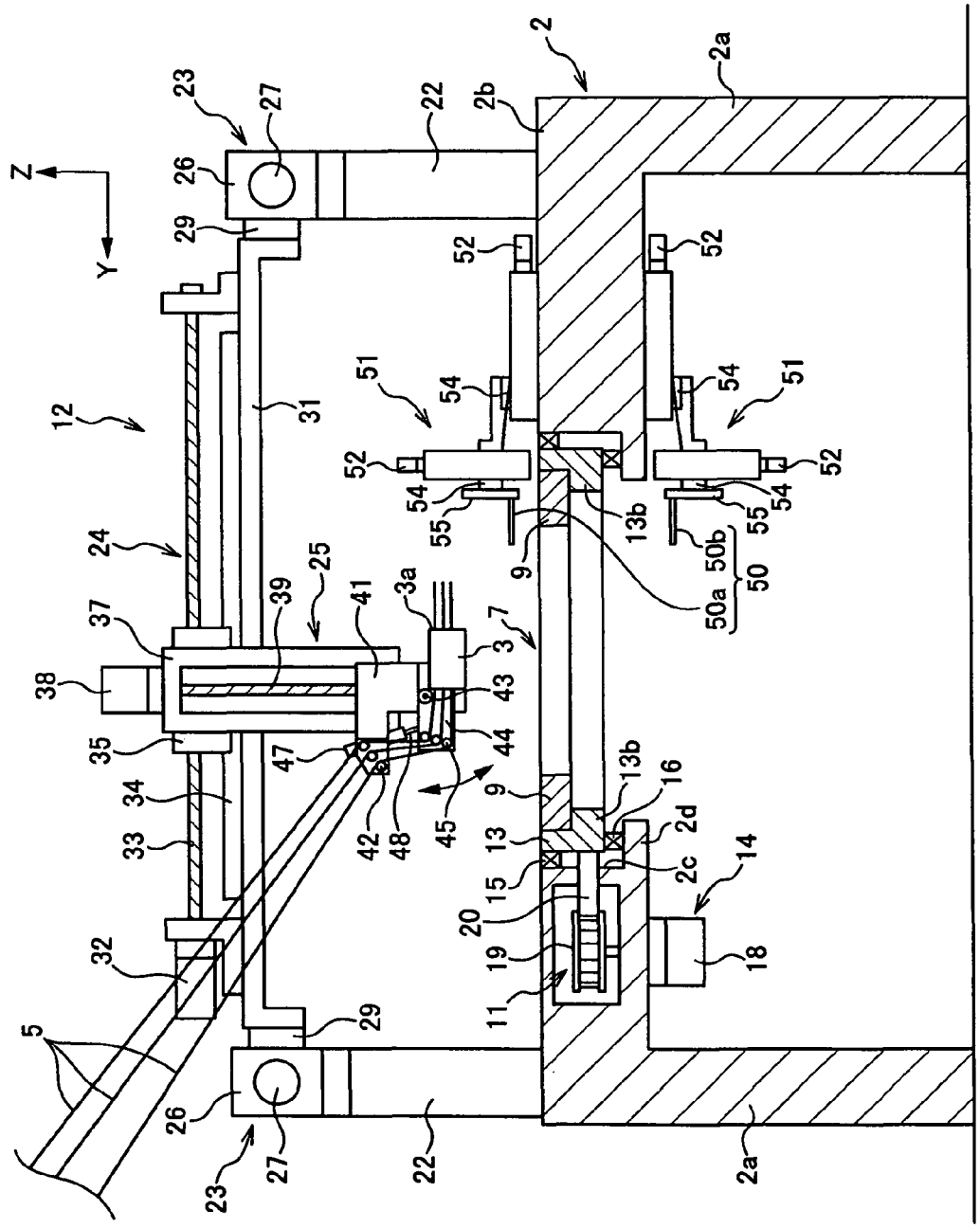
FIG. 2 is a sectional view showing the winding device according to an embodiment of this invention.

First, referring to FIGS. 1 and 2, the constitution of a winding device 1 according to an embodiment of this invention will be described. FIG. 1 is a perspective view showing the winding device 1, and FIG. 2 is a sectional view of the winding device 1.

It should be noted that three intersecting axes, namely X, Y, Z, have been set, and in the following description, the X axis, Y axis and Z axis respectively denote a substantially horizontal front-back direction, a substantially horizontal lateral direction, and a substantially vertical direction.

The winding device 1 is a device that simultaneously winds a plurality of wire rods around a core 7 constituting a stator (multi polar armature) of an inner rotor-type motor.

The core 7 comprises an annular yoke 8, and teeth 9 disposed around an inner periphery of the yoke 8 to form a plurality of winding cores projecting toward the center of the yoke 8. Slots 10 open inwardly between the teeth 9. The winding device 1 winds wire rods 5 automatically around each of the circularly arranged teeth 9.

The winding device 1 comprises an index mechanism 11 (see FIG. 2) that rotates the core 7 around its central axis, a nozzle 3 that reels out a plurality of the wire rods 5, and a nozzle moving mechanism 12 that moves the nozzle 3 in the three axial directions. The index mechanism 11 and nozzle moving mechanism 12 are disposed on a pedestal 2.

The pedestal 2 is constituted by a leg portion 2a and a base 2b supported by the leg portion 2a.

The index mechanism 11 comprises a core fulcrum 13 formed as a substantially annular member that supports the core 7, and a drive mechanism 14 that drives the core fulcrum 13 to rotate.

The core 7 is placed on an annular projecting portion 13b formed in an inner peripheral lower portion of the core fulcrum 13, and supported on the core fulcrum 13 by fitting a key 13a formed on the inner periphery of the core fulcrum 13 into a key groove 7a formed on the outer periphery of the core 7.

A circular opening portion 2c penetrating in the Z axis direction is formed in the base 2b. The core fulcrum 13 is disposed at the inside of the opening portion 2c so as to be free to rotate via a bearing 15 disposed on the inner periphery of the opening portion 2c and a bearing 16 disposed on an annular projecting portion 2d formed in an inner peripheral lower portion of the opening portion 2c.

The drive mechanism 14 comprises a motor 18 disposed on a lower surface of the base 2b, a pulley 19 coupled to an output shaft end portion of the motor 18, which penetrates the base 2b, and a belt 20 that connects the pulley 19 to the core fulcrum 13. When the motor 18 is driven to rotate, the rotation of the motor 18 is transmitted to the core fulcrum 13 via the pulley 19 and the belt 20, and thus the core 7 rotates about its central axis.

The nozzle moving mechanism 12 comprises a pair of X axis moving mechanisms 23 extending in the X axis direction and supported on support posts 22 that stand upright on the base 2b, a Y axis moving mechanism 24 interposed between the pair of X axis moving mechanisms 23 so as to extend in the Y axis direction, and a Z axis moving mechanism 25 connected to the Y axis moving mechanism 24 so as to extend in the Z axis direction.

The X axis moving mechanisms 23 each comprise a casing 26 supported by two of the support posts 22, an X axis drive motor 27 disposed on an end portion of the casing 26, a ball screw 28 connected to an output shaft of the X axis drive motor 27 so as to extend in the X axis direction, and a follower 29 screwed to the ball screw 28.

The Y axis moving mechanism 24 comprises an X axis direction movable carriage 31, the two end portions of which are coupled to the pair of followers 29 of the X axis moving mechanisms 23, a Y axis drive motor 32 disposed on the X axis direction movable carriage 31, a ball screw 33 connected to an output shaft of the Y axis drive motor 32 so as to extend in the Y axis direction, a guide rail 34 disposed on the X axis direction movable carriage 31 so as to extend in the Y axis direction, and a follower 35 screwed to the ball screw 33 so as to be capable of moving along the guide rail 34.

The Z axis moving mechanism 25 comprises a casing 37 coupled to the follower 35 of the Y axis moving mechanism 24, a Z axis drive motor 38 disposed on an upper end portion of the casing 37, a ball screw 39 connected to an output shaft of the Z axis drive motor 38 so as to extend in the Z axis direction, and a follower 40 screwed to the ball screw 39.

A flat plate-form, L-shaped member 41 is connected to the follower 40 of the Z axis moving mechanism 25. A plurality of sheaves 42 is provided on one end of the L-shaped member 41, and a tilting platform 44 is supported on the other end so as to be capable of rotating about the X axis via a shaft 43.

The tilting platform 44 is provided with a plurality of sheaves 45, and the nozzle 3 is fixed thereto. By driving the respective drive motors 27, 32, 38 of the nozzle moving mechanism 12, the nozzle 3 can move freely in the three intersecting axial directions.

The nozzle 3 is a member formed in plate form so as to be capable of passing through the slots 10 between the teeth 9, and comprises a plurality of guide holes 4 formed so as to penetrate in the Y axis direction, into which the respective wire rods 5 are inserted. The guide holes 4 are arranged in series in the Z axis direction at predetermined intervals.

The plurality of wire rods 5 (three in this embodiment) supplied from a wire rod supply device (not shown) are guided into the respective guide holes 4 in the nozzle 3 via the sheaves 42 on the L-shaped member 41 and the sheaves 45 on the tilting platform 44. It should be noted that a predetermined tension is applied to the wire rods 5 supplied from the wire rod supply device by a tension device (not shown).

An air cylinder 47 is attached swingably to the L-shaped member 41. A rod 48 that advances and retreats by means of air pressure is inserted into the air cylinder 47, and a tip end of the rod 48 is attached swingably to the tilting platform 44. Thus, when the air cylinder 47 is driven, the tilting platform 44 rotates about the shaft 43, and as a result, the nozzle 3 can be swung.

In other words, the orientation of the nozzle 3 is controlled by the air cylinder 47. More specifically, control is performed such that when the nozzle 3 is lowered through the slot 10 while reeling out the wire rods 5, a tip end 3a thereof is oriented upward. Control is also performed such that when the nozzle 3 rises, the tip end 3a is oriented downward. Thus, the nozzle 3 is rotated in a direction causing the wire rods 5 reeled out from the respective guide holes 4 to separate from each other.

It should be noted that the structure for rotating the tilting platform 44 to swing the nozzle 3 is not limited to a link mechanism such as that described above, and a mechanism constituted by gears and the like, for example, may also be used.

In addition to the index mechanism 11 and nozzle moving mechanism 12, the winding device 1 comprises a pair of guide pins 50 (50a, 50b) that hold the wire rods 5 reeled out from the nozzle 3 during winding.

As shown in FIG. 2, the guide pins 50 are constituted by an upper portion guide pin 50a disposed above the core 7 and a lower portion guide pin 50b disposed below the core 7, which are disposed parallel to the nozzle 3 so as to sandwich the tooth 9. The guide pins 50 are capable of moving in two axial directions, namely the Y axis direction and the Z axis direction, by means of guide pin moving mechanisms 51 disposed respectively on an upper surface and a lower surface of the base 2b.

Each guide pin moving mechanism 51 comprises two motors 52, two ball screws 53 that are driven to rotate by the motors 52, and two followers 54 screwed to the ball screws 53, and moves a support plate 55 that supports the guide pin 50 in two axial directions, namely the Y axis direction and the Z axis direction.

Next, referring to FIGS. 3 and 4, an operation of the winding device 1 will be described. FIG. 3 is a view showing the chronological order of a winding operation, and FIG. 4 is a view showing an operation to undo a twist in the wire rods. In FIGS. 3 and 4, the guide holes 4 in the nozzle 3 are set as 4a, 4b and 4c, and the wire rods 5 that are unreeled from the guide holes 4a, 4b and 4c are set respectively as 5a, 5b and 5c. It should be noted that the operation of the winding device 1 to be described below is controlled automatically by a controller (not shown).

As pre-winding preparation, the core 7 is placed on the core fulcrum 13 and set in a predetermined position, and the end portions of the wire rods 5 that are to be unreeled from the tip end 3a of the nozzle 3 are held by a clamp (not shown).

The index mechanism 11 and nozzle moving mechanism 12 are then driven such that the nozzle 3 moves relative to the periphery of the tooth 9, whereby the respective wire rods 5 unreeled from the tip end 3a of the nozzle 3 are wound around the tooth 9. Referring to FIG. 3, this winding operation will now be described in detail.

Figure 3A:
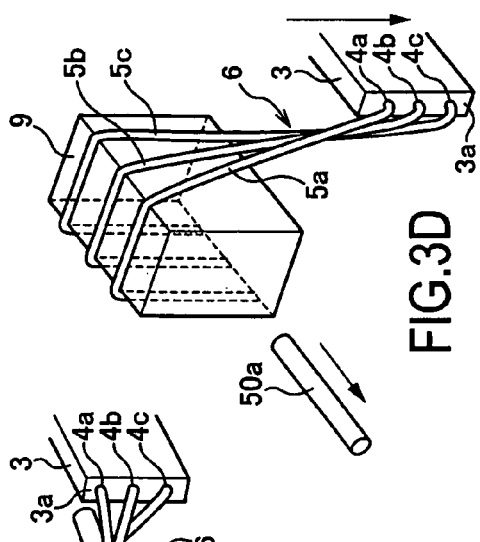
FIG. 3 is a view showing the chronological order of a winding operation.
Figure 4:
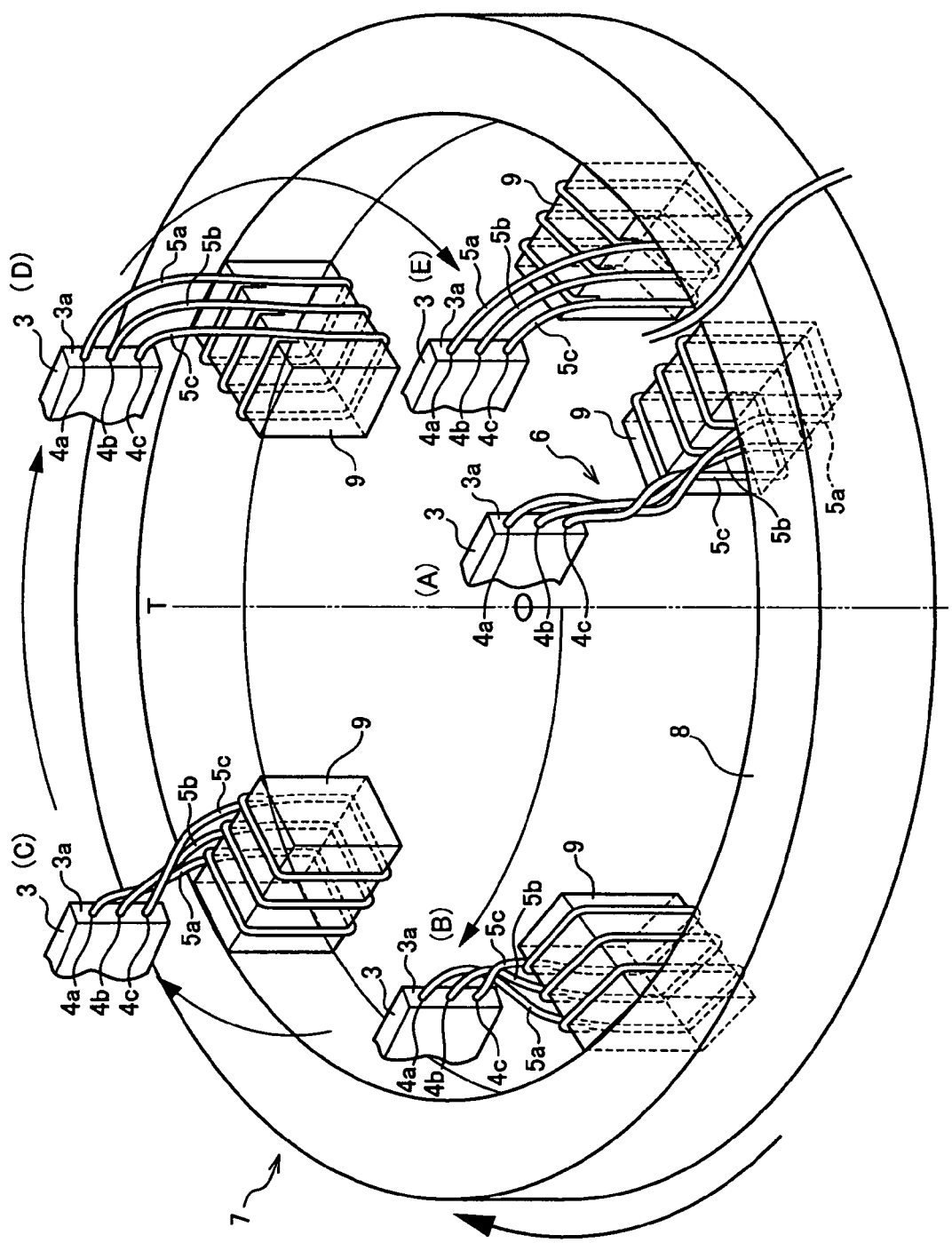
FIG. 4 is a view showing an operation to undo a twist occurring in wire rods.

A position of the nozzle 3 shown in FIG. 3A is a winding operation start position. The wire rod 5a unreeled from the guide hole 4a at the top of the nozzle 3 is positioned on a base end side of the tooth 9, the wire rod 5b unreeled from the guide hole 4b in the center of the nozzle 3 is positioned in the center of the tooth 9, and the wire rod 5c unreeled from the guide hole 4c at the bottom of the nozzle 3 is positioned on a tip end side of the tooth 9.

Figure 3D:
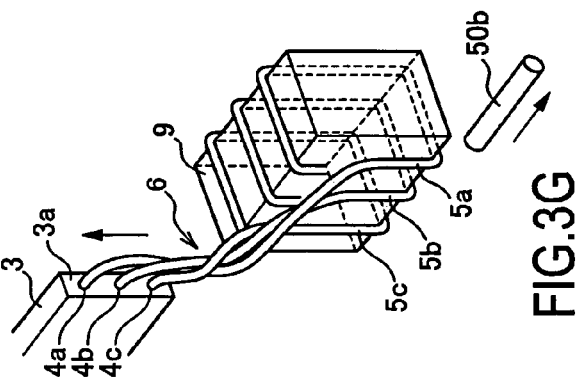
Figure 3B:
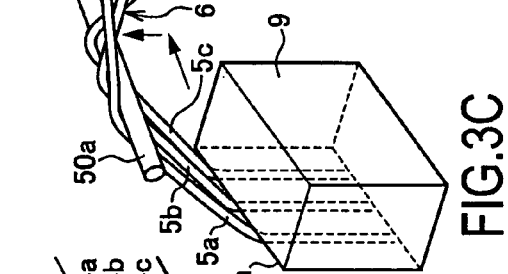

First, as shown in FIG. 3B, the core 7 is rotated by driving the index mechanism 11 such that the slot 10 is positioned directly beneath the nozzle 3. In this state, as shown in FIG. 3B, the wire rod 5a unreeled from the guide hole 4a at the top of the nozzle 3 and the wire rod 5c unreeled from the guide hole 4c at the bottom of the nozzle 3 intersect, and therefore a twist portion 6 occurs in the wire rods 5. The twist portion 6 in the wire rods 5 is located substantially centrally between the tip end 3a of the nozzle 3 and a corner portion 9a of the tooth 9. Hence, the twist portion 6 in the wire rods 5 is located substantially in the center of the two portions which bind the wire rods 5.

If the winding operation were to be continued from a state in which the wire rods 5 intersect as shown in FIG. 5B, the twist portion 6 would be wound around the tooth 9. In this case, the wire rods 5 would not be wound in a line around the tooth 9, and as a result, the space factor of the winding would decrease.

Figure 3G:
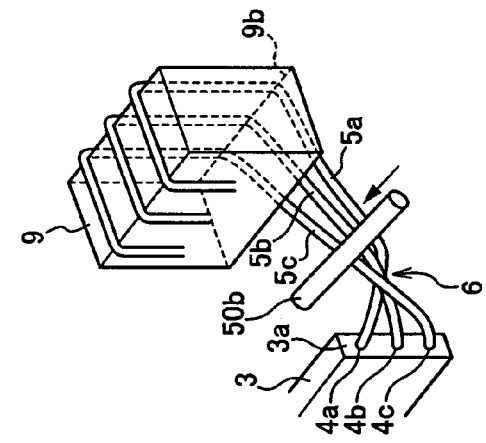
Figure 3C:
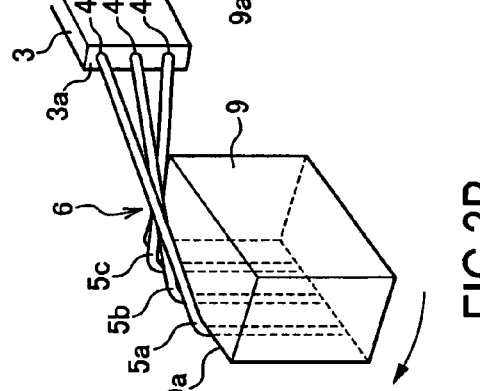

Therefore, as shown in FIG. 3C, the upper portion guide pin 50a is advanced so as to be disposed below the wire rods 5 and then moved upward such that the wire rods 5 are lifted up and held thereby. Accordingly, the wire rods 5 unreeled from the nozzle 3 are wrapped around and held by the upper portion guide pin 50a. Thus, the portion which bind the wire rods 5 shifts from the corner portion 9a of the tooth 9 to the upper portion guide pin 50a, and therefore the twist portion 6 in the wire rods 5 shifts to a substantially central position between the tip end 3a of the nozzle 3 and the upper portion guide pin 50a, or in other words to the nozzle 3 side. When the wire rods 5 unreeled from the nozzle 3 are held by the upper portion guide pin 50a in this manner, the position of the twist portion 6 is distanced from the tooth 9, and therefore the twist portion in the wire rods 5 between the corner portion 9a of the tooth 9 and the upper portion guide pin 50a disappears.

Next, as shown in FIG. 3D, the upper portion guide pin 50a is withdrawn from the wire rods 5. Although the upper portion guide pin 50a is withdrawn, the wire rods 5 possess rigidity, and therefore the twist portion 6 that has moved to the nozzle 3 side is maintained in position. Hence, when the nozzle moving mechanism 12 is driven to lower the nozzle 3, the wire rods 5 are wound in a line on an upper surface of the tooth 9. In a case where the wire rods 5 do not possess greatly rigidity such that the twist portion 6 returns to its original position when the upper portion guide pin 50a is withdrawn from the wire rods 5, winding may be performed by moving the nozzle 3 and upper portion guide pin 50a synchronously such that the wire rods 5 are wound in a line on the upper surface of the tooth 9, and then withdrawing the upper portion guide pin 50a.

As shown in FIG. 3D, when the nozzle 3 passes through the slot 10 to become positioned below the core 7, the wire rod 5a unreeled from the guide hole 4a at the top of the nozzle 3 and the wire rod 5c unreeled from the guide hole 4c at the bottom of the nozzle 3 intersect, and therefore a half-revolution twist occurs in the wire rods 5.

As the nozzle 3 moves below the slot 10 while reeling out the wire rods 5, the tilting platform 44 is rotated such that the tip end 3a of the nozzle 3 faces upward. As a result, friction between the wire rods 5 unreeled from the nozzle 3 is reduced, and the wire rods 3 can be prevented from becoming entangled.

Figure 3E:
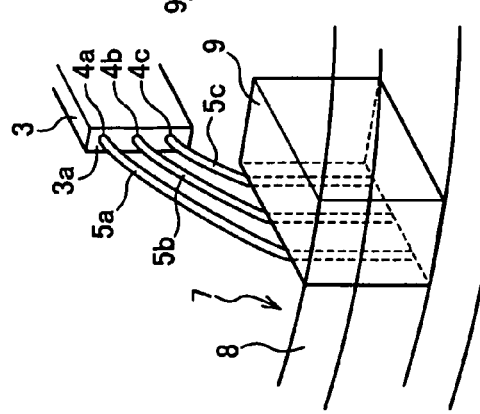

Next, as shown in FIG. 3E, the index mechanism 11 is driven to rotate the core 7 such that the slot 10 is positioned directly above the nozzle 3. Thus, the wire rods 5 are wound in a line on one side face of the tooth 9.

In the state shown in FIG. 3E, the twist portion 6 in the wire rods 5 is located substantially centrally between the tip end 3a of the nozzle 3 and a corner portion 9b of the tooth 9. If the winding operation were to be continued from this state, the twist portion 6 would be wound around the tooth 9.

Figure 3F:
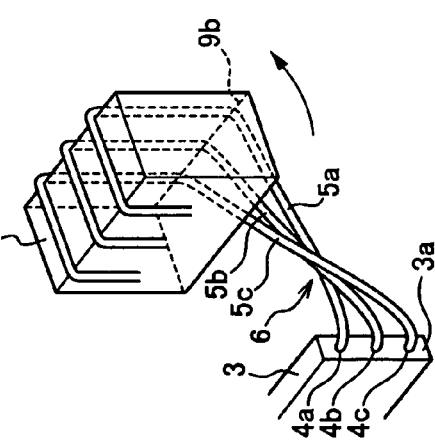

Therefore, as shown in FIG. 3F, the lower portion guide pin 50b is advanced so as to be disposed above the wire rods 5 and moved downward so as to press down and hold the wire rods 5. Accordingly, the wire rods 5 unreeled from the nozzle 3 are wrapped around the lower portion guide pin 50b and held thereby. Thus, the twist portion 6 in the wire rods 5 shifts to a substantially central position between the tip end 3a of the nozzle 3 and the lower portion guide pin 50b, or in other words to the nozzle 3 side. When the wire rods 5 unreeled from the nozzle 3 are held by the lower portion guide pin 50b in this manner, the position of the twist portion 6 is distanced from the tooth 9, and therefore the twist portion in the wire rods 5 between the corner portion 9b of the tooth 9 and the lower portion guide pin 50b disappears.

Next, as shown in FIG. 3G, the lower portion guide pin 50b is withdrawn from the wire rods 5 and the nozzle moving mechanism 12 is driven to raise the nozzle 3. As a result, the wire rods 5 are wound in a line on a lower surface of the tooth 9. In the state shown in FIG. 3G, the nozzle 3 has completed a single revolution around the tooth 9.

As the nozzle 3 moves upward through the slot 10 while reeling out the wire rods 5, the tilting platform 44 is rotated such that the tip end 3a of the nozzle 3 faces downward. As a result, friction between the wire rods 5 unreeled from the nozzle 3 is reduced, and the wire rods 3 can be prevented from becoming entangled.

When the nozzle 3 passes through the slot 10 to rise above the core 7, the wire rod 5a and the wire rod 5c form a further half-revolution twist. Hence, as shown in FIG. 3G, when the nozzle 3 completes a single revolution around the tooth 9, a single-revolution twist occurs in the wire rods 5.

As described above, the winding operation for winding the wire rods 5 around the tooth 9 is performed by combining the rotation of the core 7, which is produced by the index mechanism 11, and the movement of the nozzle 3 through the slot 10, which is produced by the nozzle moving mechanism 12.

As the nozzle 3 moves relative to the periphery of the tooth 9, the orientation of the nozzle 3 to the tooth 9 does not vary. In other words, the guide hole 4a in the nozzle 3 is always at the top and the guide hole 4c is always at the bottom. Hence, when the nozzle 3 completes a single revolution around the tooth 9, a single-revolution twist occurs in the wire rods 5.

Next, referring to FIG. 4, an operation to undo the twist in the wire rods 5 will be described. In FIG. 4, a position (A) corresponds to FIG. 3G. Further, FIG. 4 shows only the tooth 9 around which winding is performed, and the other teeth are not illustrated.

Once the nozzle 3 has been moved relative to the periphery of the tooth 9 to wind the wire rods 5 once around the tooth 9, as shown in FIG. 3, the index mechanism 11 is driven to rotate the core 7 about a central axis T thereof, as shown in FIG. 4. Further, the nozzle moving mechanism 12 is driven to cause the nozzle 3 to follow the rotation of the tooth 9. The nozzle 3 is caused to follow the tooth 9 as the core 7 rotates in order to keep the distance between the nozzle 3 and the tooth 9 fixed at all times and keep the tension of the wire rods 5 between the nozzle 3 and the tooth 9 constant.

A position (B) in FIG. 4 shows a state in which the core 7 has rotated 90 degrees. A position (C) shows a state in which the core 7 has rotated 180 degrees. A position (D) shows a state in which the core 7 has rotated 270 degrees, and a position (E) shows a state in which the core 7 is about to complete a 360-degree revolution.

As can be seen from the variation from the position (A) to the position (E), when the core 7 completes a single revolution about its central axis T, the single-revolution twist in the wire rods 5 is undone.

Hence, by having the core 7 perform a single revolution about its central axis T and having the nozzle 3 follow the tooth 9 as the core 7 rotates every time the nozzle 3 completes a single revolution around the tooth 9, the twist that occurs in the wire rods 5 during the winding operation is undone.

By repeating the winding operation shown in FIG. 3 and the twist undoing operation shown in FIG. 4, the wire rods 5 can be wound in a line around the tooth 9.

It should be noted that a case in which the wire rods 5 are wound around a single tooth 9 was described above, but this invention may also be applied to a case in which the wire rods 5 are wound so as to straddle a plurality of the teeth 9.

Further, an inner type winding device that performs winding around a core constituting a stator of an inner rotor-type motor was described above. However, this invention is not limited thereto, and may also be applied to an outer type winding device that performs winding around a core constituting a stator of an outer rotor-type motor.

According to the embodiment described above, the following actions and effects are exhibited.

The twist that occurs in the wire rods every time the nozzle 3 completes a single revolution around the tooth 9 is undone by causing the core 7 to perform a single revolution about its central axis and causing the nozzle 3 to follow the tooth 9 as the core 7 rotates. Further, the index mechanism 11 employed in the operation for winding the wire rods 5 is used to rotate the core 7 in order to undo the twist in the wire rods 5. Hence, there is no need for a dedicated mechanism that rotates the core 7 to undo the twist in the wire rods 5, and therefore the twist in the wire rods 5 can be undone by means of a simple structure.

Further, the wire rods 5 are wound onto the tooth 9 by temporarily holding the wire rods 5 unreeled from the nozzle 3 on the guide pin 50 to move the twist portion 6 in the wire rods 5 to the nozzle 3 side, and then withdrawing the guide pin 50 so that the wire rods 5 are dropped onto the tooth 9. By performing winding when the twist portion 6 in the wire rods 5 is distanced from the tooth 9 in this manner, the twist portion 6 in the wire rods is prevented from being wound around the tooth 9. Further, when an attempt is made to wind the wire rods 5 in a line around the tooth 9 without using the guide pin 50, the distance between the tooth 9 and the nozzle 3 must be increased to distance the twist portion 6 from the tooth 9. However, by employing the guide pin 50, the position of the twist portion 6 can be distanced from the tooth 9, thereby eliminating the need to increase the distance between the tooth 9 and the nozzle 3, and as a result, the winding device itself can be made more compact.

This invention is not limited to the embodiment described above, and may of course be subjected to various modifications within the scope of the technical spirit thereof.

What is claimed is:

1. A winding device for a multi polar armature, which simultaneously winds a plurality of wire rods onto a core on which a plurality of winding cores are arranged circularly, comprising:

an index mechanism for rotating the core about a central axis thereof;

a nozzle for reeling out the plurality of wire rods; and a nozzle moving mechanism for moving the nozzle, wherein, every time the nozzle completes a single revolution around a winding core, a twist occurring in the wire rods is undone by having the index mechanism cause the core to perform a single revolution about the central axis thereof and having the nozzle moving mechanism cause the nozzle to follow the winding core as the core performs the single revolution in order to keep the distance between the nozzle and the winding core fixed.

2. The winding device for a multi polar armature as defined in claim 1, further comprising a guide pin that distances the twist in the wire rods from the winding core by holding the wire rods that are reeled out from the nozzle as the wire rods are wound onto the winding core.

3. A winding method for a multi polar armature, in which a plurality of wire rods are wound simultaneously onto a core on which a plurality of winding cores are arranged circularly, comprising the steps of:

winding the plurality of wire rods onto a winding core by moving a nozzle that reels out the wire rods relative to a periphery of the winding core; and undoing a twist occurring in the wire rods by causing the core to perform a single revolution about a central axis thereof and causing the nozzle to follow the winding core as the core performs the single revolution in order to keep the distance between the nozzle and the winding core fixed every time the nozzle completes a single revolution around the winding core.

4. The winding method for a multi polar armature as defined in claim 3, wherein, in the winding step, the wire rods are wound, onto the winding core in a state where the twist in the wire rods is distanced from the winding core by using a guide pin to hold the wire rods reeled out from the nozzle.

5. The device of claim 1, further comprising a pedestal having an opening, and wherein:

the pedestal includes a leg portion and an upper board, the opening being formed in the upper board; and the index mechanism includes a core fulcrum disposed inside the opening of the upper board, the core being disposed in the core fulcrum.

6. The method of claim 3, further comprising a pedestal having an opening, and wherein the winding step includes moving the nozzle in the opening of the pedestal in a vertical direction.

* * * * *